(12) United States Patent
Ishii et al.

(10) Patent No.: US 8,928,248 B2
(45) Date of Patent: Jan. 6, 2015

(54) STEP UP/DOWN CONVERTER

(71) Applicant: Panasonic Corporation, Osaka (JP)

(72) Inventors: Takuya Ishii, Osaka (JP); Takeshi Azuma, Osaka (JP)

(73) Assignee: Panasonic Corporation, Osaka (JP)

( * ) Notice: Subject to any disclaimer, the term of this patent is extended or adjusted under 35 U.S.C. 154(b) by 160 days.

(21) Appl. No.: 13/762,947

(22) Filed: Feb. 8, 2013

(65) Prior Publication Data

US 2013/0162171 A1 Jun. 27, 2013

Related U.S. Application Data

(63) Continuation of application No. PCT/JP2012/001211, filed on Feb. 22, 2012.

(30) Foreign Application Priority Data

Jun. 3, 2011 (JP) ................................. 2011-124974

(51) Int. Cl.
*H05B 37/02* (2006.01)
*G05F 1/618* (2006.01)
(Continued)

(52) U.S. Cl.
CPC ................ *G05F 1/618* (2013.01); *H05B 37/02* (2013.01); *H02M 3/1582* (2013.01); *H05B 33/0818* (2013.01); *H02M 2001/0009* (2013.01)
USPC ........... 315/291; 315/247; 315/307; 315/224; 315/226; 323/222; 323/225; 323/232; 323/233; 323/285

(58) Field of Classification Search
CPC ............... H05B 37/02; H02M 3/1582; H02M 2001/0009; H02M 2001/0012; H02M 2003/1552; H02M 3/156; Y02B 20/346; Y02B 3/347
USPC ............. 315/291, 247, 224, 307, 227 R, 232, 315/216, 226; 323/222, 225, 229, 232, 233, 323/285
See application file for complete search history.

(56) References Cited

U.S. PATENT DOCUMENTS 7,649,325 B2 * 1/2010 McIntosh et al. .............. 315/291
7,808,217 B2 * 10/2010 de Cremoux et al. ......... 323/222
(Continued)

FOREIGN PATENT DOCUMENTS

| JP | 11-098825 A | 4/1999 |
|---|---|---|
| JP | 2005-237052 A | 9/2005 |

(Continued)

OTHER PUBLICATIONS

International Search Report issued in International Patent Application No. PCT/JP2012/001211 mailed on May 15, 2012.

*Primary Examiner* — Haiss Philogene
(74) *Attorney, Agent, or Firm* — McDermott, Will & Emery

(57) ABSTRACT

Provided is a step up/down converter, in which the inductor current can be easily detected by a simple configuration in any connecting mode of the switches. This comprises a first switch, one end of which is connected to an input power source, and the other end of which is connected to one end of the inductor, a second switch, one end of which is connected to the one end of the inductor, and the other end of which is connected to a reference potential applying unit, a third switch and a fourth switch, one end of which is connected to the other end of the inductor; a capacitor circuit element, connected between the other end of the third switch and the other end of the fourth switch, and configured to generate an output voltage for applying to a load, a detecting resistor, connected between the other end of the second switch and the other end of the third switch, and configured to detect an inductor current flowing through the inductor, and a control circuit configured to perform control from the first switch to the fourth switch based on the inductor current detected by the detecting resistor.

7 Claims, 6 Drawing Sheets

(51) Int. Cl.
*H02M 3/158* (2006.01)
*H05B 33/08* (2006.01)
*H02M 1/00* (2006.01)

(56) References Cited

U.S. PATENT DOCUMENTS 8,508,964 B2 * 8/2013 Gray et al. .................. 363/98
2006/0176038 A1 8/2006 Flatness et al.
2007/0290667 A1 12/2007 Nagai et al.
2009/0273325 A1 11/2009 Nakahashi et al.
2011/0101944 A1 5/2011 Uchiike

FOREIGN PATENT DOCUMENTS

| JP | 2008-022695 A | 1/2008 |
| JP | 2009-194971 A | 8/2009 |
| JP | 2011-097732 A | 5/2011 |
| JP | 2011-109825 A | 6/2011 |

* cited by examiner

STEP UP/DOWN CONVERTER

CROSS REFERENCE TO RELATED APPLICATIONS

This is a continuation application under 35 U.S.C 111(a) of pending prior International Application No. PCT/JP2012/001211, filed on Feb. 22, 2012.

BACKGROUND OF THE INVENTION

1. Field of the Invention

The present invention relates to a step up/down converter for converting an input DC voltage from a power source into a predetermined DC voltage using an inductor, and supplies the predetermined DC voltage to a load, and particularly relates to a step up/down converter for controlling at a predetermined DC voltage based on an inductor current flowing through an inductor.

2. Description of the Related Art

In a step up/down converter, which converts an input DC voltage from a power source into a predetermined DC voltage by employing an inductor, and supplies it to a load, a configuration employing a H bridge circuit, in which inductor current flowing through an inductor is controlled by using four switches, is known (for example, see Japanese Laid-Open Patent Application Publication No. 2005-237052).

FIG. 6 is a circuit diagram, illustrating a schematic configuration of a conventional step up/down converter. As shown in FIG. 6, a step up/down converter comprises a DC power supply 105, an inductor 106, first to fourth switches 101 to 104, two of which are connected to each of both ends of the inductor 106, an output capacitor 107 for applying output voltage Vo to a load 108, a first current detecting resistor 91 for detecting electric current flowed to the third switch 103, a second current detecting resistor 92 to detect electric current flowed to the second switch 102, and a control circuit 110 for switching ON/OFF of the respective switches 101 to 104 based on electric current detected by the first and the second current detecting resistors 91 and 92.

In such a step up converter, the control circuit 110 provides control so as to achieve alternative (complementary) switching ON between the first switch 101 and the second switch 102 and to achieve the alternative (complementary) switching ON between the third switch 103 and the fourth switch 104. When the first switch 101 and the third switch 103 are switched ON and the second switch 102 and the fourth switch 104 are switched OFF (first state), an input voltage Vi of the DC power supply 105 is applied to the inductor 106, and energy becomes to be accumulated in the inductor 106 as the increase in the inductor current IL. Thereafter, the first switch 101 and the third switch 103 are switched OFF and the second switch 102 and the fourth switch 104 are switched ON (second state) to cause the output capacitor 107 to be charged with the energy accumulated in the inductor 106 through the second switch 102 and the fourth switch 104. The output capacitor 107 is charged with electric charge to increase the output voltage Vo applied to the load 108.

FIG. 7 is a graph, showing a signal waveform in each unit of the step up/down converter as shown in FIG. 6. At the time of the first state, the increasing inductor current IL is detected at the first electric current detecting resistor 91. In the step up/down converter shown in FIG. 6, when the detected voltage Vs10 based on the inductor current IL detected at the first electric current detecting resistor 91 reaches the upper limit current command value (voltage) V10 that is previously defined, the control circuit 110 switches the respective switches 101 to 104 to the second state. At the time of the second state, the decreasing inductor current IL is detected at the second electric current detecting resistor 92. In the step up/down converter shown in FIG. 6, when the detected voltage Vs20 based on inductor current IL detected at the second current detecting resistor 92 is reached to the previously defined lower limit current command value (voltage) V20, the control circuit 110 switches the respective switches 101 to 104 to the first state. As described above, the drive control of the respective switches 101 to 104 are achieved based on the inductor current IL detected by the current detecting resistors 91 and 92 corresponding to the respective states. Therefore, the upper limit current command value V10 and the lower limit current command value V20 are adjusted to control the output voltage Vo and the output current Io supplied to the load 108.

[Patent Literature 1] Japanese Laid-Open Patent Application Publication No. 2005-237052

SUMMARY OF THE INVENTION

Known operation mode in the step up/down converter employing the above-described H bridge circuit includes, in addition to the operations as described in Patent Document 1, operation modes known as a step up mode and a step down mode. In the step up mode, under the condition that the first switch 101 is fixed ON and the second switch 102 is fixed OFF, the third switch 103 and the fourth switch 104 are repeatedly switched ON and OFF in a complementary manner to raise the input voltage and then is output. On the other hand, in the step down mode, under the condition that the third switch 103 is fixed OFF and the fourth switch 104 is fixed ON, the first switch 101 and the second switch 102 are repeatedly switched ON and OFF in a complementary manner to reduce the input voltage and then is output.

However, when the first switch 101 and the fourth switch 104 are switched ON and the second switch 102 and the third switch 103 are switched OFF, the conventional step up/down converter shown in FIG. 6 is in a state where both current detecting resistors 91 and 92 are not in connection with the inductor 106, causing a problem that the inductor current IL cannot be detected. Thus, after all, in the circuit architecture shown in FIG. 6 as described above, only the operation mode for alternately switching between the first state and the second state can be applied and therefore neither mode of step up nor step down can be adopted.

A method for inserting a resistor in series with the inductor and detecting the voltage drop due to the current flowing through the resistance may also be considered as another presumable method for detecting the inductor current. However, the voltage at the resistor connected in series with the inductor is increased or decreased in response to the switching of the respective switches 101 to 104, and therefore, in order to accurately detect the current flowing through the inductor, it is necessary to detect the connecting state of the respective switches 101 to 104 and carry out a correction of the detected voltage depending on the connecting state. Therefore, complicated circuit configuration is required.

The present invention is directed to solving such a problem in the conventional technology, and it is an object of the present invention to provide a step up/down converter of H bridge type, in which the inductor current can be easily detected by a simple configuration in any connecting mode of the switches.

A step up/down converter according to one aspect of the present invention, comprises an inductor; a first switch, one end of which is connected to an input power source, and the other end of which is connected to one end of the inductor, the input power source being configured to generate an input DC voltage in which a reference potential is a reference voltage; a second switch, one end of which is connected to the one end of the inductor, and the other end of which is connected to a reference potential applying unit for applying the reference potential; a third switch, one end of which is connected to other end of the inductor; a fourth switch, one end of which is connected to the other end of the inductor; a capacitor circuit element, connected between the other end of the third switch and the other end of the fourth switch, the capacitor circuit element being configured to charge electric charge based on the input DC voltage according to a connecting state from the first switch to the fourth switch, and to generate an output voltage applied to a load based on the charged electric charge; a detecting resistor, connected between the other end of the second switch and the other end of the third switch, and configured to detect an inductor current flowing through the inductor; and a control circuit configured to perform control for driving from the first switch to the fourth switch based on the inductor current detected by the detecting resistor.

In accordance with this configuration, since the detecting resistor for detecting the inductor current is connected between the other end of the second switch and the other end of the third switch, a situation in which a detecting resistor is present in a path formed across two switches is achieved in any of the connecting modes including the state where the first switch and the fourth switch are ON and the second switch and the third switch are OFF. Therefore, the inductor current can be easily detected by using the detecting resistor with a simple configuration in any of the connecting modes of the switches.

The control circuit may be configured to detect a first detection signal based on the output voltage, and wherein the control circuit may comprise: a first adjusting unit for adjusting the first detection signal based on the output voltage to correspond to a signal level of a predetermined first reference signal; a second adjusting unit for adjusting a second detection signal containing a signal component based on the output voltage and a signal component based on the detected inductor current to correspond to a signal level of a predetermined second reference signal; and a driving-signal generating unit for generating a driving signal for driving from the first switch to the fourth switch based on the first adjusting unit and the second adjusting unit. In accordance with this configuration, feedback control of the output voltage is carried out in a state in which the first reference signal is the reference in the first adjusting unit, and the feedback control of the additional value of the voltage based on the inductor current and the output voltage is carried out in a state in which the second reference signal is the reference in the second adjusting unit. As described above, the feedback control is carried out for each of the output voltage and the inductor current to allow the power conditioning with further enhanced accuracy and rapid response speed.

The first adjusting unit may include a first error amplifier for amplifying an error between the first detection signal based on the output voltage and the predetermined first reference signal to generate a first error signal, and the second adjusting unit may include an inductor current detecting circuit for generating a current signal generated by averaging a voltage based on the inductor current detected by the detecting resistor; a second error amplifier for amplifying an error between the second detection signal and the predetermined second reference signal, to generate a second error signal, the second detection signal being a sum of a voltage based on the current signal and the first error signal; and an offset circuit for subtracting an offset signal from the second error signal to generate a third error signal, and the driving-signal generating unit may comprise: a first comparator for comparing the second error signal with a predetermined triangular wave signal to generate a first driving signal for driving the first switch and the second switch according to the result of the comparison; and a second comparator for comparing the third error signal with the triangular wave signal to generate a second driving signal for driving the third switch and the fourth switch according to the result of the comparison. In accordance with this configuration, the first adjusting unit and the second adjusting unit can be easily configured by using the error amplifier, and the driving signals for driving the respective switches in response to the output of the first adjusting unit and the second adjusting unit can be easily configured by using the comparator.

The control circuit may be configured so as not to detect the inductor current from the detecting resistor when the third switch is placed in an electrical continuity state. In a state in which the third switch is placed in an electrical continuity state, the voltage based on the inductor current starts to increase precipitously, so that there may cause a sudden spike voltage. Therefore, it is configured not to detect the switching noise based on such a spike voltage to prevent a generation of an incorrect driving signal for the respective switches.

The load may contain a light emitting element. In addition, the load may include a light emitting element and a constant current source circuit connected in series with the light emitting element, and the first adjusting unit may be configured to detect a voltage of the constant current source circuit as the first detected voltage. Further, the first reference signal may be a voltage corresponding to a minimum voltage required for an operation of the constant current source circuit. This allows conducting the feedback control so that the first detection signal based on the output voltage is identical to the voltage of the smallest value (minimum voltage) required for the operation of the constant current source circuit. Therefore, the output voltage is suitably adjusted in the minimum voltage required for the operation of the constant current source circuit with enhanced accuracy, such that a stable light emission device with low power consumption can be achieved.

The present invention is configured as described above, and exhibits an advantageous effect, in which the inductor current can be easily detected with a simple configuration in any of the connecting modes of the switches in the H bridge type step up/down converter.

The above and further objects, features and advantages of the present invention will more fully be apparent from the following detailed description of preferred embodiments with accompanying drawings.

DETAILED DESCRIPTIONS OF THE PREFERRED EMBODIMENTS

Figure 1:
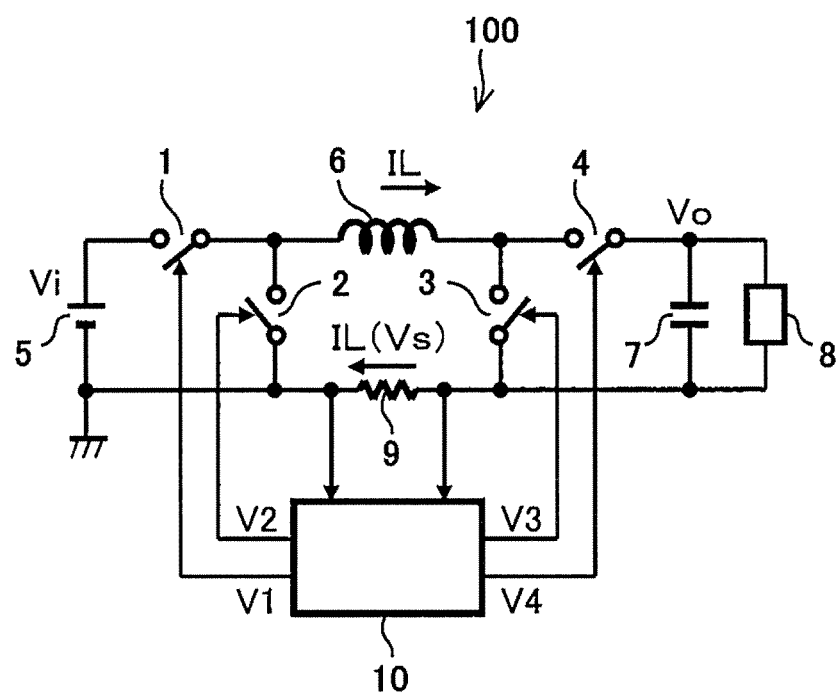
FIG. 1 is a circuit diagram, illustrating an exemplary schematic configuration of a step up/down converter according to first embodiment of the present invention.

Preferable embodiments of the present invention will be described hereinafter in reference to the annexed figures. Hereinafter, the identical reference numeral is assigned to the equivalent or associated element through all diagrams, and the duplicated descriptions will not be presented.

First Embodiment

First of all, first embodiment of the present invention will be described. FIG. 1 is a circuit diagram, illustrating an exemplary schematic configuration of a step up/down converter according to first embodiment of the present invention. As shown in FIG. 1, a step up/down converter 100 of the present embodiment is connected to an input power source 5, which generates an input DC voltage Vi, in which a reference potential (ground potential in the present embodiment) is a reference. The step up/down converter 100 comprises four switches 1 to 4, an inductor 6 and a capacitor circuit element (output capacitor in the present embodiment) 7 to constitute and H bridge type step up/down converter. The step up/down converter 100 is configured to adjust an output voltage Vo (or output current) supplied to a load 8 connected to the output capacitor 7 by switching the respective switches 1 to 4 to cause a change of a mode for accumulating electric charge in the output capacitor 7. In the present embodiment, the load 8 is connected in parallel with the output capacitor 7. The switches 1 to 4 are configured of, for example, N-channel MOS transistors. Alternatively, the first switch 1 and the fourth switch 4 may be configured of P-channel MOS transistors, and the second switch 2 and the third switch 3 may be configured of N-channel MOS transistors. In such case, a common signal is utilized for driving the first switch 1 and the second switch 2, and another common signal is utilized for driving the third switch 3 and the fourth switch 4, so that complementary operations between the first switch 1 and the second switch 2 and between the third switch 3 and the fourth switch 4 can be easily achieved.

More in detail, one end of the first switch 1 is connected to one end of the input power source 5, and the other end of the first switch 1 is connected to one end of the inductor 6. Also, one end of the second switch 2 is connected to the one end of the inductor 6, and the other end of the second switch 2 is connected to a reference potential applying unit (ground in the present embodiment) GND for providing reference potential. One end of the third switch 3 is connected to the other end of the inductor 6, and the other end of the third switch 3 is connected to the output capacitor 7. One end of the fourth switch 4 is connected to the other the ends of the inductor 6, and the other end of the fourth switch 4 is connected to the output capacitor 7. More specifically, it is configured that the output capacitor 7 is connected between the other end of the third switch 3 and the other end of the fourth switch 4, so that electric charge based on the input DC voltage Vi is charged according to the connecting states from the first switch 1 to the fourth switch 4, and the output voltage Vo is applied to the load 8 based on the accumulated electric charge.

Further, the step up/down converter includes a detecting resistor 9, which detects an inductor current IL flowing through the inductor 6. The detecting resistor 9 is connected between the second switch 2 and the third switch 3. In other words, the detecting resistor 9 is connected between the output capacitor 7 (and load 8) and the ground GND. The step up/down converter 100 also includes a control circuit 10, which conducts a control for driving from the first switch 1 to the fourth switch 4 based on the inductor current IL detected by the detecting resistor 9.

Hereinafter, the respective control actions of the step up/down converter 100 of the present embodiment will be described. First of all, when the step up/down converter 100 is operated in a step down mode, the control signal from the control circuit 10 achieves the operational situation where the third switch 3 is fixed as OFF (non electrical-continuity state) and the fourth switch 4 is fixed ON (electrical continuity state), and the first switch 1 and the second switch 2 are alternatively switched ON (placed in an electrical continuity state) (in a complementary manner). More specifically, when the first switch 1 is ON and the second switch 2 is OFF, electric current flows in the following sequences: the input power source 5→the first switch 1→the inductor 6→the fourth switch 4→the output capacitor 7 and the load 8→the detecting resistor 9→the input power source 5. This allows supplying electric charge based on the input DC voltage Vi of the input power source 5 to the output capacitor 7 through the inductor 6 and the electric charge is eventually accumulated in the output capacitor 7. Thereafter, when the first switch 1 is switched OFF and the second switch 2 is switched ON, electric current flows in the following sequences: the inductor 6→the fourth switch 4→the output capacitor 7 and the load 8→the detecting resistor 9→the second switch 2→the inductor 6. This allows accumulating the energy in the inductor 6 based on the electric charge accumulated in the output capacitor 7. As described above, in the operation of the step down mode, in either of the state that electric charge is accumulated in the output capacitor 7 or the state that the energy is accumulated in the inductor 6, the electric current flows through the detecting resistor 9 similarly as flowing through the inductor 6.

In the next, when the step up/down converter 100 is operated in the step up mode, the control signal from the control circuit 10 achieves the operational situation where the first switch 1 is fixed ON (electrical continuity state) and the second switch 2 is fixed OFF (non electrical-continuity state), and the third switch 3 and the fourth switch 4 are alternatively switched ON (placed in an electrical continuity state) (in a complementary manner). More specifically, when the third switch 3 is ON and the fourth switch 4 is OFF, electric current flows in the following sequences: the input power source 5 the first switch 1→the inductor 6→the third switch 3→the detecting resistor 9→the input power source 5. This allows accumulating energy in the inductor 6 based on the input DC voltage Vi of the input power source 5. Then, once the third switch 3 is switched OFF and the fourth switch 4 is switched ON, electric current flows in the following sequences: the input power source 5→the first switch 1→the inductor 6→the fourth switch 4→the output capacitor 7 and the load 8 the detecting resistor 9→the input power source 5. This allows accumulating energy in the output capacitor 7 based on the energy accumulated in the inductor 6. As described above, also in the operation of the step up mode, in either of the state that electric charge is accumulated in the output capacitor 7 or the state that the energy is accumulated in the inductor 6, the electric current flows through the detecting resistor 9 similarly as flowing through the inductor 6.

Figure 2:
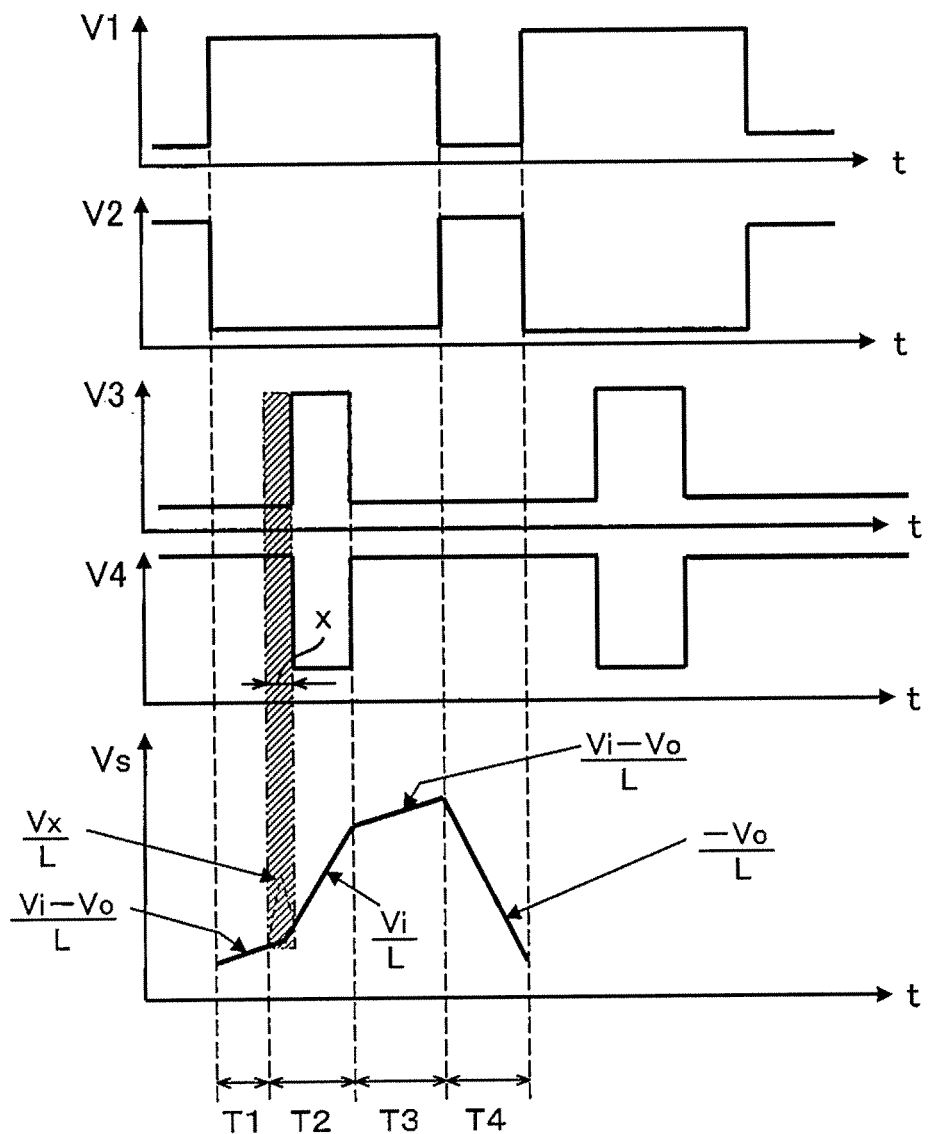
FIG. 2 are graphs showing examples of signal waveforms of the respective switches of the step up/down converter shown in FIG. 1 in the step up/down mode and examples of waveforms of the detected voltages obtained by detecting the resistor thereby.

Further, the step up/down converter 100 of the present embodiment implements the step up/down mode for switching the four switches 1 to 4 (any of the switches 1 to 4 are not fixed in ON or OFF) when the difference between the input DC voltage Vi and the defined output voltage Vo is small. FIG. 2 is graphs showing examples of signal waveforms of the respective switches of the step up/down converter shown in FIG. 1 in the step up/down mode and examples of waveforms of the detected voltages obtained by detecting the resistor thereby. The detected voltage Vs changes in response to the inductor current IL, and thus FIG. 2 illustrates the change of the inductor current IL by the voltage variation based on this change. The step up/down mode shown in FIG. 2 indicates the aspect of the operation, in which the third switch 3 that is operated in a complementary manner with the operation of the fourth switch 4 is switched: OFF→ON→OFF, while the first switch 1 is ON. In addition to above, the step up/down mode applicable to the step up/down converter 100 in the present embodiment is not limited to this operational mode.

First, in the term T1 shown in FIG. 2, the first switch 1 is ON and the second switch 2 is OFF, and the third switch 3 is off and the fourth switch 4 is ON. At this time, the inductor 6 is applied with an input-output difference voltage Vi−Vo, which is a voltage difference between the input DC voltage Vi of the input power source 5 and the output voltage Vo of the output converter 7. The inductor current IL flows in the following sequence: the input power source 5→the first switch 1→the inductor 6→the fourth switch 4→the output capacitor 7 and the load 8→the detecting resistor 9→the input power source 5, and changes according to a slope represented by (Vi−Vo)/L. Here, since the example in the case of Vi>Vo is shown in FIG. 2, the inductor current IL increases in the term T1.

Next, in the term T2, while the connecting states of the first switch 1 and the second switch 2 (the first switch 1 is ON: the second switch 2 is OFF) are retained, the third switch 3 is switched ON and the fourth switch 4 is switched OFF. At this time, the input DC voltage Vi is applied to the inductor 6. In addition, the inductor current IL flows in the following sequence: the input power source 5→the first switch 1→the inductor 6→the third switch 3→the detecting resistor 9→the input power source 5, and increases according to a slope represented by Vi/L. Further, in the term T3, the states of the respective switches 1 to 4 are the same as the states in the term T1 (again, the third switch 3 and the fourth switch 4 are switched in a complementary manner). Then, in the term T4, while the connecting states of the third switch 3 and the fourth switch 4 (the third switch 3 is OFF: the fourth switch 4 is ON) are retained, the first switch 1 is switched OFF and the second switch 2 is switched ON. At this time, the inductor 6 is inversely applied with the output voltage Vo (−Vo is applied). The inductor current IL flows in the following sequence: the inductor 6→the fourth switch 4→the output capacitor 7 and the load 8→the detecting resistor 9→the second switch 2→the inductor 6, and decreases according to a slope represented by −Vo/L.

As described above, in any of the states in the operation of the step up/down mode, the electric current flows through the detecting resistor 9 similarly as flowing through the inductor 6.

As described above, since the detecting resistor 9 for detecting the inductor current IL is connected between the other end of the second switch 2 and the other end of the third switch 3 according to the above-described configuration, the situation where a detecting resistor 9 is present in the path formed across two switches is achieved in any of the connecting modes including the state where the first switch 1 and the fourth switch 4 are ON and the second switch 2 and the third switch 3 are OFF. Therefore, in any types of the connecting aspects, an electric current equivalent to the inductor current IL is flowed through the detecting resistor 9. This allows easy detection of the inductor current IL with a simple configuration using the detecting resistor 9 in any of the connecting modes of the switches 1 to 4. Further, since the peak value and the valley value of the electric current flowing through the respective switches 1 to 4 can be easily detected at a single location, namely at the detecting resistor 9, the detected electric current can be easily adopted to an overcurrent protection and/or an output control.

In addition to above, the control circuit 10 is configured so as not to detect the inductor current from the detecting resistor 9 when the third switch 3 is switched ON as shown in FIG. 2 in the present embodiment.

In the case that the second switch 2 and the third switch 3 are composed of N-channel transistors, once the driving electric power for those switches is supplied to the input power source 5, the driving current to the third switch 3 particularly flows through the detecting resistor 9. Thus, when the third switch 3 is switched ON in the step up mode or in the step up/down mode, sudden spike voltage Vx may be superimposed as a switching noise in the detected voltage Vs detected by the detecting resistor 9 as indicated with the dotted line of FIG. 2. If the driving signals to the respective switches 1 to 4 of the step up/down converter 100 are generated based on the detected voltage Vs containing the superimposed spike voltage Vx, a situation of unstable output voltage Vo (situation of false operation) may be caused.

Therefore, a dead band x, in which no detected voltage Vs is detected from the detecting resistor 9, is provided before and after the timing of the switching ON of the third switch 3, such that unwanted detection of switching noise based on such a spike voltage Vx is prevented. This allows preventing a generation of an incorrect driving signal for the respective switches by providing the dead band x, even if the spike voltage Vx is unignorable. A typical configuration for providing the dead band x may be achieved by, for example, providing a switch (not shown) for intercepting the connection between the control circuit 10 and the detecting resistor 9 for a constant term (the term from the start of the switching of the third switch 3 from OFF to ON until the completion of such a switching) according to the driving signal for switching ON of the third switch 3.

Here, the major control mode for the switching converter including the step up/down converter 100 includes a voltage mode and a current mode. Both control modes involve eventually adjusting a proportion of the ON time (the duty ratio) in a single cycle of the switching cycles of the switch [pulse width modulation (PWM) control]. However, there is difference between them, in which the voltage mode involves directly adjusting the duty ratio while the current mode involves adjusting the inductor current IL to provide controlled duty ratio. Thus, it is known that the current mode, which can utilize the inductor 6 as an equivalent electric current source, provides lower degree of converter transfer function, leading to easy phase compensation and enhanced fast responsiveness. This current mode control scheme includes an average current mode control scheme and a peak current mode control scheme. The average current mode control scheme is a control scheme that involves adjusting the average value of the inductor current IL to control the converter, and the peak current mode control scheme is a control scheme that involves adjusting the peak value of the inductor current IL to control the converter.

In the step up/down converter 100 of the present embodiment, the point for generating the peak of the inductor current IL changes depending on whether it is in the step down mode or in the step up mode. In addition, even in the equivalent step up/down mode, the point for providing the peak of the inductor current IL changes depending on the level of the input and output voltage Vi−Vo as shown in FIG. 2. For example, the electric current increases in the term T3 in the case of Vi>Vo, and thus the peak of the inductor current IL is at the termination point of the term T3 (=starting point of the term T4), and on the contrary, the electric current decreases in the term T3 in the case of Vi<Vo, and thus the peak of the inductor current IL is at the starting point of the term T3 (=termination point of the term T2). Thus, in the present embodiment, it is preferable to employ the average current mode control scheme for controlling the average of the inductor current IL, rather than employing the peak current mode control scheme for driving the respective switches 1 to 4 so as to control the peak of the inductor current IL.

Second Embodiment

Figure 3:
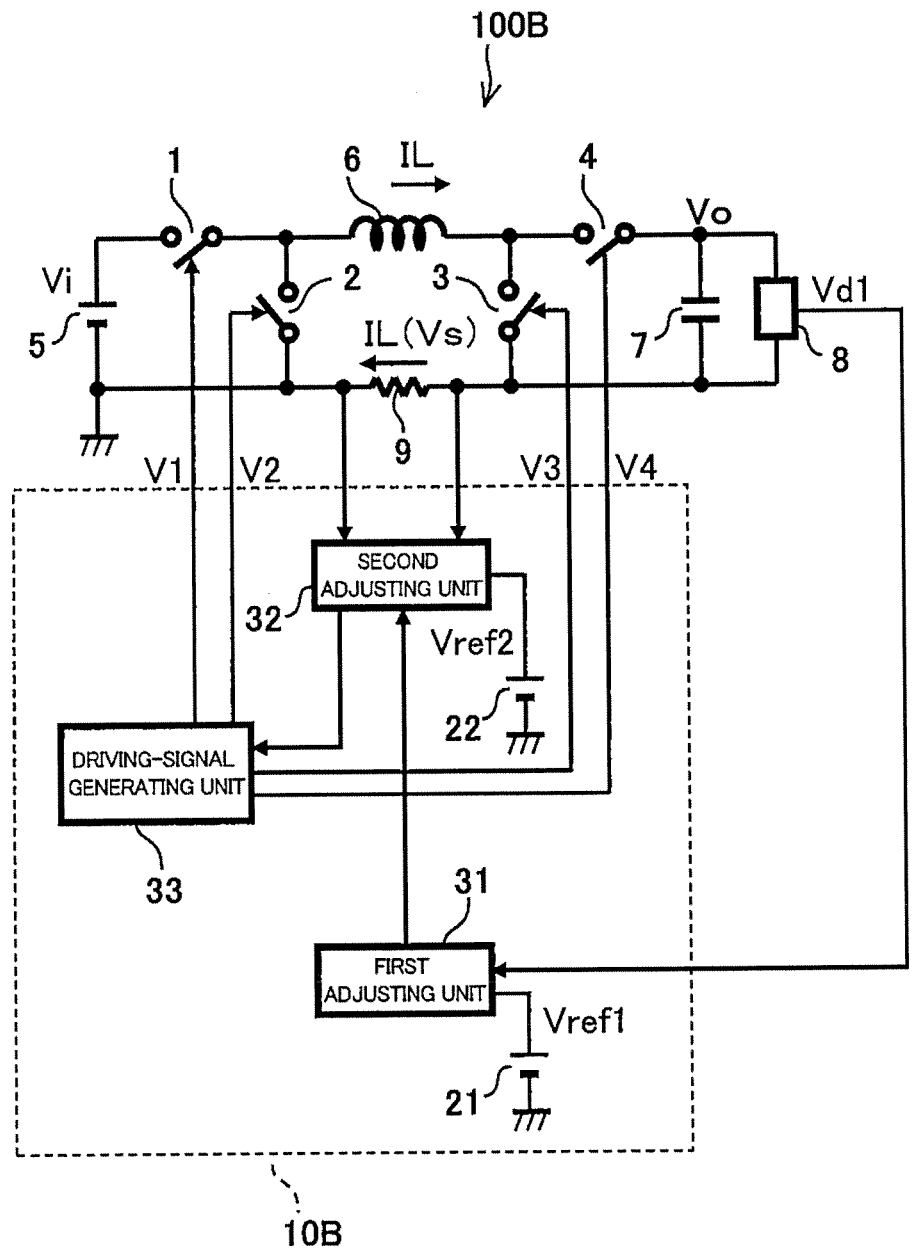
FIG. 3 is a circuit diagram, illustrating an exemplary schematic configuration of a step up/down converter according to second embodiment of the present invention.

Next, second embodiment of the present invention will be described. FIG. 3 is a circuit diagram, illustrating an exemplary schematic configuration of a step up/down converter according to second embodiment of the present invention. In the present embodiment, the identical reference numeral is assigned to a configuration similar to that adopted in first embodiment, and further description is not presented. Features of a step up/down converter 100B of the present embodiment, which are different from the first embodiment, are that a control circuit 10B detects a first detection signal Vd1 based on an output voltage Vo and a driving signal is generated based on the first detection signal Vd1.

More specifically, the control circuit 10B includes: a first adjusting unit 31 for adjusting the first detection signal Vd1 based on the output voltage Vo to correspond to a signal level of a predetermined first reference signal (voltage) Vref1; a second adjusting unit 32 for adjusting a second detection signal Vd2 (as will be discussed later) containing a signal component based on the output voltage Vo and a signal component based on the detected inductor current IL detected by the detecting resistor 9 to correspond to a signal level of a predetermined second reference signal (voltage) Vref2; and a driving-signal 1 generating unit 33 for generating driving signals V15, V16 for driving from the first switch 1 to the fourth switch 4 based on the first adjusting unit 31 and the second adjusting unit 32. In addition, the control circuit 10B includes a first reference voltage source 21 for generating the first reference signal voltage Vref1 and a second reference voltage source 22 for generating the second reference signal voltage Vref2.

According to this configuration, the feedback control of the output voltage Vo can be performed in a state in which the first reference signal voltage Vref1 is a reference in the first adjusting unit 31, and the feedback control of additional value of the voltage Vs based on the inductor current IL and the output voltage Vo can be performed in a state in which the second reference signal voltage Vref2 is a reference in the second adjusting unit 32. As described above, the feedback controls for the respective output voltage Vo and inductor current IL are conducted to allow the power conditioning with further enhanced accuracy and rapid response speed.

Figure 4:
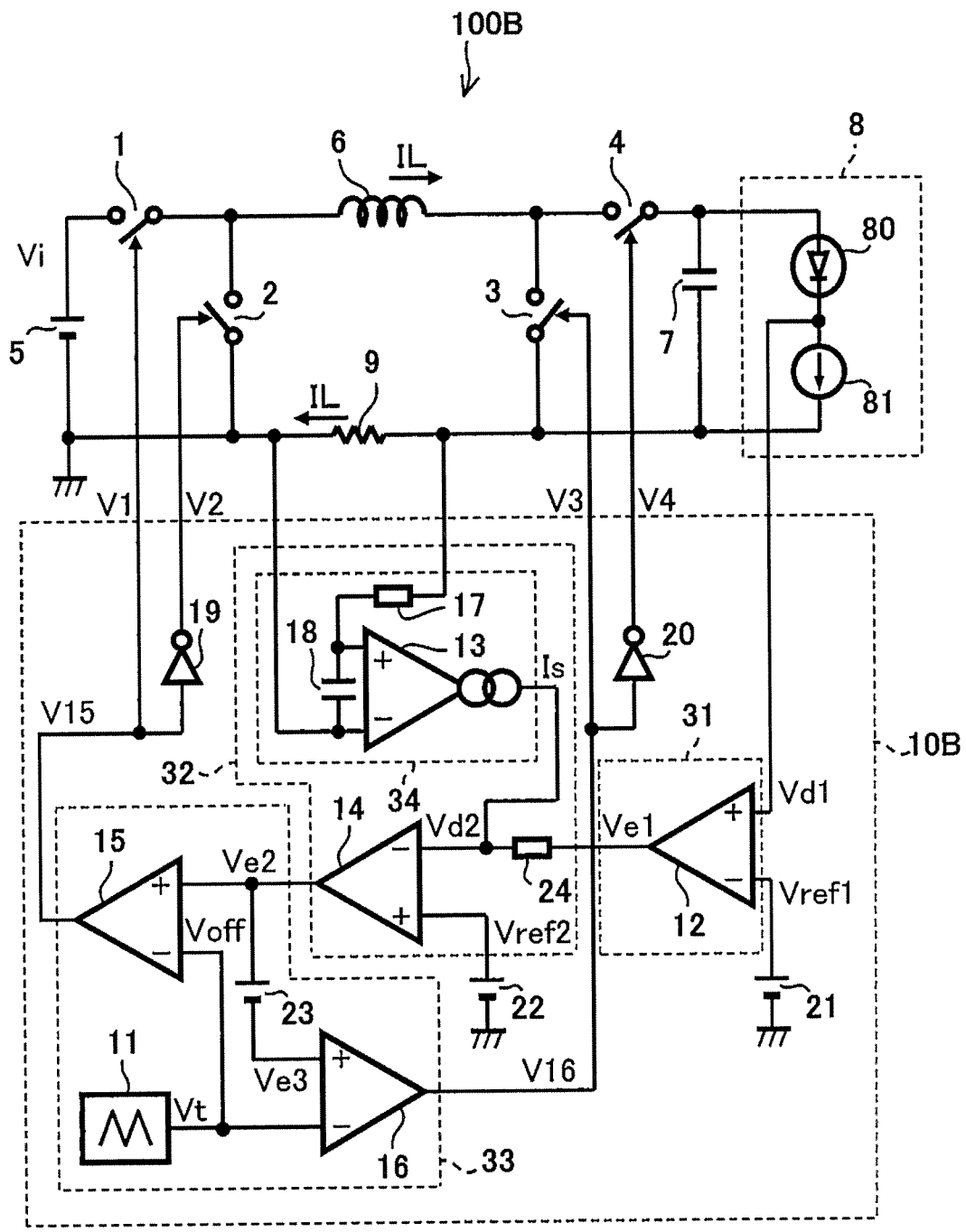
FIG. 4 is a circuit diagram, illustrating an example of a specific configuration of the step up/down converter shown in FIG. 3.

Further description will be made in reference to circuit that is more specific. FIG. 4 is a circuit diagram, illustrating an example of a specific configuration of the step up/down converter shown in FIG. 3. FIG. 4 shows an example containing a light emitting element (LED, for example) 80 as the load 8. The load 8 further includes a constant current source circuit 81 for flowing electric current required for the light emission of the light emitting element 80. The light emitting element 80 is connected in series with the constant current source circuit 81.

The first adjusting unit 31 includes a first error amplifier 12 for amplifying an error between the first detection signal Vd1 based on the output voltage Vo and the first reference signal voltage Vref1 to generate a first error signal Ve1. In the present embodiment, the first adjusting unit 31 is configured to detect the voltage of the constant current source circuit 81 as the first the detected voltage Vd1. A non-inverting input end of the first error amplifier 12 is applied with the voltage of the constant current source circuit 81, and an inverting input end of the first error amplifier 12 is applied with the first reference signal voltage Vref1 of the first reference voltage source 21. Upon such a configuration, the first error amplifier 12 outputs an amplified error signal between the voltage of the constant current source circuit 81 and the first reference signal voltage Vref1 as the first error signal Ve1.

In addition, the second adjusting unit 32 includes: an inductor current detecting circuit 34 for generating a current signal Is generated by averaging the voltage Vs based on the inductor current IL detected by the detecting resistor 9; a second error amplifier 14 for amplifying an error between the second detection signal Vd2 and the second reference signal voltage Vref2 to generate a second error signal Ve2; and an offset circuit 23 for subtracting an offset signal Voff from the second error signal Ve2 to generate a third error signal Ve3. The second detection signal Vd2 is a sum of a voltage R24·Is based on the current signal Is and the first error signal Ve1.

The inductor current detecting circuit 34 includes: a resistor 17 and a capacitor 18, which are coupled in series with each other and connected in parallel with the detecting resistor 9; and a third error amplifier 13, a non-inverting input end of which is connected to one end of the capacitor 18 and an inverting input end of which is connected to the other end of the capacitor 18, so that the voltage applied to the capacitor 18 is amplified, and is converted into an electric current, and output it. The inductor current detecting circuit 34 averages the voltage Vs applied to detecting resistor 9 by means of the resistor 17 and the capacitor 18, and inputs the average voltage of the voltage Vs based on the inductor current IL to the third error amplifier 13, and converts this average voltage into the current signal Is and then outputs it.

In addition, the output end of the third error amplifier 13 is input to the inverting input end of the second error amplifier 14. Further, the inverting input end of the second error amplifier 14 is connected to the output end of the first error amplifier 12 through a resistor 24. More specifically, a voltage signal which is a sum of a voltage drop component R24·Is of the resistor 24 (resistance R24) due to the current signal Is based on the inductor current IL and the first error signal Ve1 is input to the inverting input end of the second error amplifier 14, as the second detection signal Vd2 (=Ve1+R24·Is). In addition, the non-inverting input end of the second error amplifier 14 is connected to the second reference voltage source 22 to be applied with the second reference signal voltage Vref2. Then, the second error amplifier 14 outputs a signal generated by amplifying an error between the second detection signal Vd2 and the second reference signal voltage Vref2 as the second error signal Ve2.

In addition, the driving-signal generating unit 33 includes: a first comparator 15 for comparing the second error signal Ve2 with a predetermined triangular wave signal Vt to generate a first driving signal V15, which drives the first switch 1 and the second switch 2, according to the result of the comparison; a second comparator 16 for comparing the third error signal Ve3 output from the offset circuit 23 with the triangular wave signal Vt to generate a second driving signal V16, which drives the third switch 3 and the fourth switch 4, according to the result of the comparison.

The offset circuit 23 is composed of a voltage source, which generates an offset voltage Voff, and is provided between the output end of the second error amplifier 14 and the non-inverting input end of the second comparator 16. Therefore, the third error signal Ve3 applied to the non-inverting input end of the second comparator 16 is a voltage generated by subtracting the offset voltage Voff from the second error signal Ve2 (Ve3=Ve2−Voff). In addition, the output end of the second error amplifier 14 is also connected to the non-inverting input end of the first comparator 15. In addition, the driving-signal generating unit 33 includes a triangular wave generating circuit 11, which outputs the triangular wave signal Vt. The triangular wave signal Vt output from the triangular wave generating circuit 11 is input to the inverting input ends of the first comparator 15 and the second comparator 16, respectively.

Further, the control circuit 10B includes a first inverter 19 for inverting the output of the first comparator 15 (namely the first driving signal V15) and a second inverter 20 for inverting the output of the second comparator 1 (namely the second driving signal V16). In the present embodiment, the first driving signal V15 is utilized as the driving signal V1 (=V15) of the first switch 1 without processing, and the inverted signal (V2=−V15) of the first driving signal V15 by the first inverter 19 is adopted as the driving signal V2 for the second switch 2, which is operated in a complementary manner with the first switch 1. In addition, the second driving signal V16 is utilized as the driving signal V3 (=V16) of the third switch 3 without processing, and the inverted signal (V4=−V16) of the second driving signal V16 inverted by the second inverter 20 is adopted as the driving signal V4 for the fourth switch 4, which is operated in a complementary manner with the third switch 3.

As described above, a comparison between the second error signal Ve2 and the triangular wave signal Vt is carried out in the first comparator 15. The first comparator 15 outputs a signal level (first signal level H), which induces a situation that the driving signal V1 (=V15) switches the first switch 1 ON and the driving signal V2 (=−V15) switches the second switch 2 OFF, when the signal level of the second error signal Ve2 is higher than the signal level of the triangular wave signal Vt, and also outputs a signal level (second signal level L), which induces a situation that the driving signal V1 (=V15) switches the first switch 1 OFF and the driving signal V2 (=−V15) switches the second switch 2 ON, when the signal level of the second error signal Ve2 is lower than the signal level of the triangular wave signal Vt. In addition, a comparison between the second error signal Ve2 and the triangular wave signal Vt is carried out in the second comparator 16. The second comparator 16 outputs a signal level (first signal level H), which induces a situation that the driving signal V3 (=V16) switches the third switch 3 ON and the driving signal V4 (=−V16) switches the fourth switch 4 OFF, when the signal level of the third error signal Ve3 is higher than the signal level of the triangular wave signal Vt, and also outputs a signal level (second signal level L), which induces a situation that the driving signal V3 (=V16) switches the third switch 3 OFF and the driving signal V4 (=−V16) switches the fourth switch 40N, when the signal level of the third error signal Ve3 is lower than the signal level of the triangular wave signal Vt.

As described above, the first adjusting unit 31 and the second adjusting unit 32 can be easily configured by employing the error amplifiers 12 and 14, and the driving signals V1 to V4 for driving the respective switches 1 to 4 in response to the outputs of the first adjusting unit 31 and the second adjusting unit 32 can be easily generated by employing the comparators 15 and 16.

In the present embodiment, the first reference signal Vref1 is a voltage that corresponds to the voltage of the smallest value (hereinafter, referred to as minimum voltage) required for the operation of the constant current source circuit 81. This allows achieving a feedback control, so that the first detection signal Vd1 based on the output voltage Vo is identical to the minimum voltage required for the operation of the constant current source circuit 81. Therefore, the output voltage Vo can be suitably adjusted to the minimum voltage required for the operation of the constant current source circuit 81 with enhanced accuracy, and therefore the stable light emission device with low power consumption can be achieved.

Figure 5:
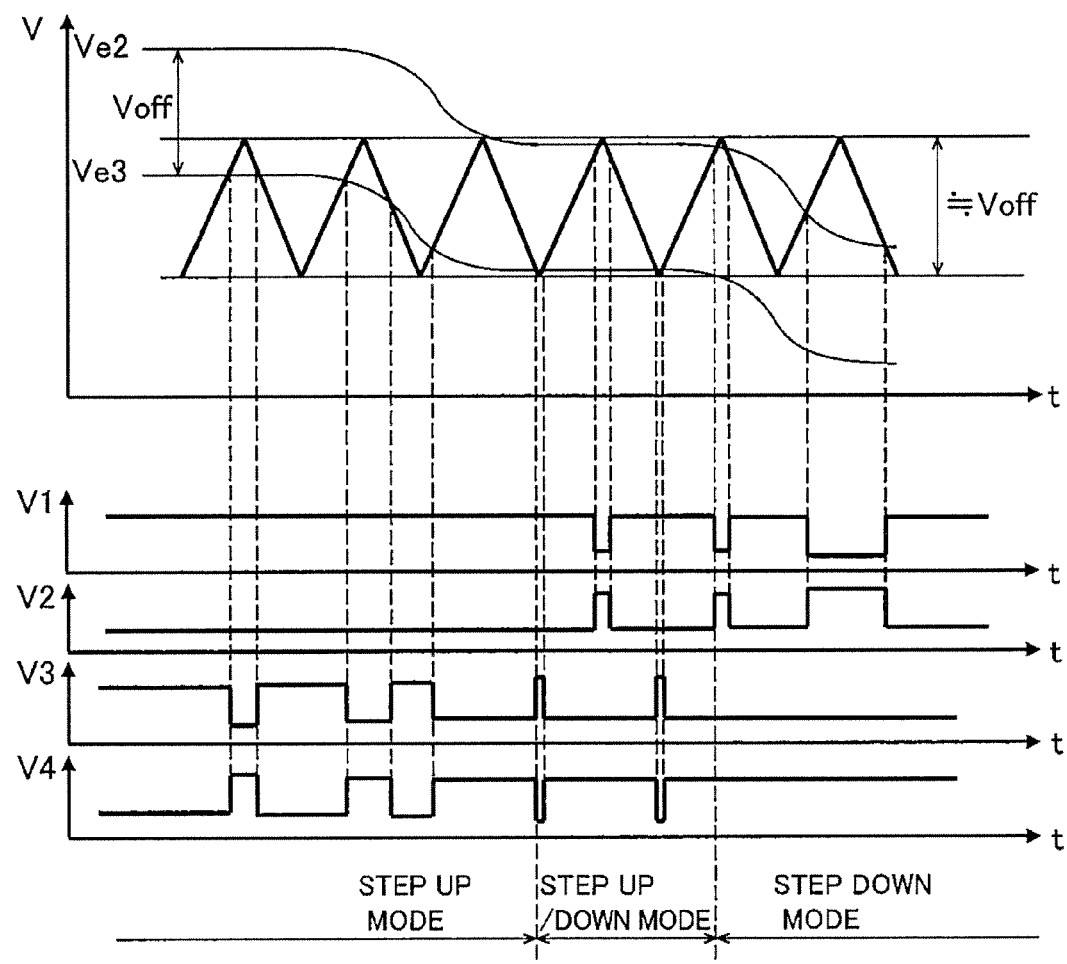
FIG. 5 is graphs showing the respective signal waveforms of a control circuit in the step up/down converter shown in FIG. 4.
Figure 6:
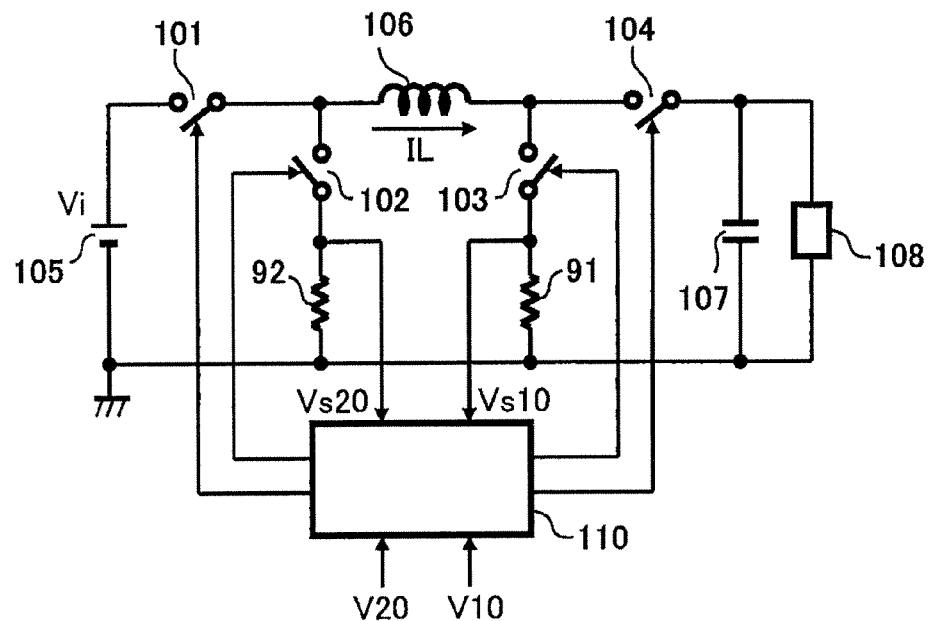
FIG. 6 is a circuit diagram, illustrating a schematic configuration of a conventional step up/down converter.
Figure 7:
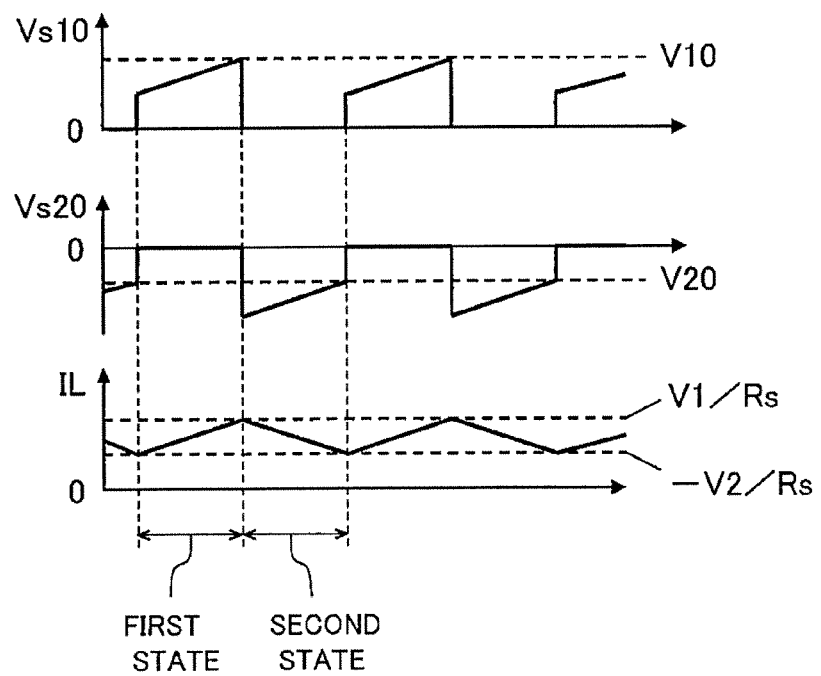
FIG. 7 is graphs showing signal waveforms in respective units of the step up/down converter shown in FIG. 6.

Hereinafter, the operation of the step up/down converter 100B for the purpose of stabilizing the constant current source circuit 81 at the first reference signal voltage Vref1, which is the operable minimum voltage, will be described. FIG. 5 is graphs showing the respective signal waveforms of a control circuit in the step up/down converter shown in FIG. 4.

First of all, when the first detected voltage Vd1, which is the voltage of the constant current source circuit 81, is elevated to the level higher than the first reference voltage Vref1, the signal level of the first error signal Ve1 output from the first error amplifier 12 is also increased. Therefore, the second detection signal Vd2=R24·Is+Ve1 is also elevated. When the second detection signal Vd2 is elevated to the level higher than the second reference voltage Vref2 by this operation, the second error signal Ve2 output by the second error amplifier 14 is decreased. When the second error signal Ve2 is decreased, the third error signal Ve3 (=Ve2−Voff), which is to be input to the second comparator 16, is also decreased.

Here, the driving-signal generating unit 33 generates the driving signals for driving the first switch 1 to the fourth switch 4, respectively, in response to the results of the comparisons of the second error signal Ve2 and the third error signal Ve3 with the triangular wave signal Vt. More specifically, when the signal level of the second error signal Ve2 or the third error signal Ve3 falls between the maximum value and the minimum value of the triangular wave signal Vt, the duty ratio of the associated driving signal is changed.

Thus, the configuration is provided so that the voltage difference between the maximum value and the minimum value of the triangular wave signal Vt is substantially identical to the offset voltage Voff, and the configuration is also provided so that, when the first detection signal Vd1 is substantially identical to the first reference signal Vref1, the signal level of the second error signal Ve2 is substantially identical to the maximum value of the triangular wave signal Vt and the signal level of the third error signal Ve3 is substantially identical to the minimum value of the triangular wave signal Vt.

This achieves the operation in the step up mode (the first switch 1 is fixed ON and the second switch 2 is fixed OFF, and the third switch 3 and the fourth switch 4 are alternatively switched ON) when the signal level of the second error signal Ve2 is higher than the maximum value of the triangular wave signal Vt, and the signal level of the third error signal Ve3 is in the level between the maximum value and the minimum value of the triangular wave signal Vt. In addition, the operation in the step up/down mode (the switches 1 to 4 are not fixed, and each of the switches 1 to 4 changes in response to the comparison with the triangular wave signal Vt) is achieved, when the second error signal Ve2 and the third error signal Ve3 are decreased and both of the signal levels of the second error signal Ve2 and the third error signal Ve3 are in the levels between the maximum value and the minimum value of the triangular wave signal Vt. Further, the operation in the step down mode (the third switch 3 is fixed OFF and the fourth switch 4 is fixed ON, and the first switch 1 and the second switch 2 are alternatively switched ON) is achieved, when the second error signal Ve2 and the third error signal Ve3 are further decreased, and the signal level of the second error signal Ve2 is in the level between the maximum value and the minimum value of the triangular wave signal Vt, and the signal level of the third error signal Ve3 is in the level lower than the minimum value of the triangular wave signal Vt.

Therefore, when the second error signal Ve2 is decreased, the control circuit 10B reduces the duty ratio for the same operation mode, or changes the operation mode from the current operation mode of, for example the step up mode, to the step up/down mode, or from the current operation mode of, for example step up/down mode, to the step down mode. This allows reducing the supply of the electric power, and also reducing the output voltage Vo and furthermore the voltage of the constant current source circuit 81 (the first detection signal Vd1). Conversely, when the signal level of the first detection signal Vd1, which is equivalent to the voltage of the constant current source circuit 81, is decreased to the level lower than the first reference voltage Vref1, the voltage of the constant current source circuit 81 is increased by the inverse operation of the above-described operation. In this way, the stabilization is achieved so that the second error signal Ve2=R24·Is+Ve1 containing the signal component of the inductor current IL and the signal component of the output voltage Vo is identical to the second reference voltage Vref2. As a result, the first detection signal Vd1, which is the same as the voltage of constant current source circuit 81, is stabilized at the first reference voltage Vref1.

In the next, the operational cycle, in which the operation mode of the control circuit 10B transits according to the following sequence: the step up mode→the step up/down mode→the step down mode, will be described in detail. In addition to above, when the operational cycle for the operation mode of the control circuit 10B transits sequentially the step down mode→the step up/down mode→the step up mode, it is sufficient to carry out the inverse operation, and therefore the description thereof is not presented.

First, since the second error signal Ve2 is at higher voltage level than the triangular wave signal Vt in the case of the step up mode as shown in FIG. 5, the first comparator 15 constantly outputs the first signal level H. This provides maintaining the state, in which the first switch 1 is switched ON and the second switch 2 is switched OFF. On the other hand, the third error signal Ve3 (=Ve2−Voff) intersects with the triangular wave signal Vt, and the output of the second comparator 16 forms the impulse waveform causing the transition of the signal level at the point where the third error signal Ve3 intersects with the triangular wave signal Vt, so that the complementary operations of the third switch 3 and the fourth switch 4 for alternatively switching ON are repeated. The ON-term of the third switch 3 is shortened (the duty ratio is decreased) as the third error signal Ve3 decreases, and is extended (the duty ratio is increased) as the third error signal Ve3 increases.

In the step up mode, when the second error signal Ve2 and the third error signal Ve3 are decreased so that the second error signal Ve2 intersects with the triangular wave signal Vt, the operation mode is changed to the step up/down mode. At this time, both of the second error signal Ve2 and the third error signal Ve3 form the impulse waveform causing the transition of the signal level at the point thereof intersecting with the triangular wave signal Vt. Further, the duty ratio of the first switch 1 is sufficiently larger than the duty ratio of the third switch 3, and therefore the ON-term of the third switch 3 is included in the ON-term of the first switch 1. Therefore, the step up/down mode as described in FIG. 2 of first embodiment is implemented. In this step up/down mode, the ON-terms of both the first switch 1 and the third switch 3 are shortened (both duty ratios are reduced) as the signal levels of the second error signal Ve2 and the third error signal Ve3 decrease, and are extended (both duty ratios are increased) as the signal levels of the second error signal Ve2 and the third error signal Ve3 increase.

In step up/down mode, when the second error signal Ve2 and the third error signal Ve3 are further decreased to provide no intersection between the third error signal Ve3 and the triangular wave signal Vt, the operation mode is changed to the step down mode. At this time, the second comparator 16 constantly outputs the second signal level L. This provides maintaining the state, in which the third switch 3 is switched OFF and the fourth switch 4 is switched ON. On the other hand, since the second error signal Ve2 is still in the situation of having an intersection with the triangular wave signal Vt, the complementary operations of the first switch 1 and the second switch 2 for alternatively switching ON are repeated. The ON-term of the first switch 1 is shortened (the duty ratio is decreased) as the second error signal Ve2 decreases, and is extended (the duty ratio is increased) as the second error signal Ve2 increases.

As described above, the step up converter 100B in the present embodiment can easily detect the inductor current IL in all operation modes, and therefore the output voltage Vo to the load 8 can be stabilized. In addition, the first driving signal V15 and the second driving signal V16 are generated by employing the second error signal Ve2 and the third error signal Ve3, which is offset by the offset voltage Voff, to achieve the smooth change of the operation modes.

In addition to above, a dead band x may be additionally provided before and after the time of switching ON of the third switch 3 in FIG. 5 as described in first embodiment, through an illustration and a description are omitted in the present embodiment.

In addition to above, since the detecting resistor 9 is present in the step up/down converter 100B of the present embodiment, the reference potential of the control circuit 10B (ground GND) is not identical to the reference potential of load 8 (potential higher than ground GND). Therefore, the respective components of the control circuit are constituted so as to avoid a problem of such a voltage fluctuation. In addition, it is preferable to configure the detecting resistor 9 so that the voltage drop Vs is several tens to several hundreds mV or lower. Since the circuit of the load 8 has relatively simple structure in the light emitting element 80 as employed in the present embodiment, there is no significant influence even if the voltage drop Vs caused by the detecting resistor 9 is superimposed to the reference potential. Therefore, the step up/down converter 100B of the present embodiment is preferably employed as the power supply source for such a light emitting element 80.

In addition, while the step up/down converter shown in FIG. 3 is configured to carry out the feedback control so as to ensure the minimum voltage required for the operation of the constant current source circuit 81 of the light emitting element 80, it is not limited thereto. For example, it may configure to employ a resistor in place of the constant current source circuit 81 to achieve stabilized voltage drop.

While the preferable embodiments of the present invention have been described above, it is apparent that the present invention is not limited to the above embodiments, and may be modified and changed without departing from the scope and spirit of the invention. For example, the respective components described in a plurality of the above-described different embodiments may be arbitrarily combined. In addition, while the present embodiment has been described in the case that the potential at the side of one end of the first switch 1 (input voltage Vi) is higher than the potential at the side of the other end of the second switch 2 (ground potential), it may alternatively configure that the potential at the side of the other end of the second switch 2 is higher than the potential at the side of the one end of the first switch 1. In addition, the configuration of the respective switches 1 to 4 may alternatively employ a switch circuit or a switching device other than the N-channel MOS transistor as described in the above-described embodiment.

The step up/down converter of the present invention is configured such that the inductor current can be easily detected with a simple configuration in any of the connecting modes of the switches in the H bridge type step up/down converter, and therefore the configuration is useful.

Numeral modifications and alternative embodiments of the present invention will be apparent to those skilled in the art in view of the foregoing description. Accordingly, the description is to be construed as illustrative only, and is provided for the purpose of teaching those skilled in the art the best mode of carrying out the invention. The details of the structure and/or function may be varied substantially without departing from the spirit of the invention.

What is claimed is:

1. A step up/down converter, comprising:
an inductor;
a first switch, one end of which is connected to an input power source, and the other end of which is connected to one end of the inductor, the input power source being configured to generate an input DC voltage in which a reference potential is a reference voltage;
a second switch, one end of which is connected to the one end of the inductor, and the other end of which is connected to a reference potential applying unit for applying the reference potential;
a third switch, one end of which is connected to other end of the inductor;
a fourth switch, one end of which is connected to the other end of the inductor;
a capacitor circuit element, connected between the other end of the third switch and the other end of the fourth switch, the capacitor circuit element being configured to charge electric charge based on the input DC voltage according to a connecting state from the first switch to the fourth switch, and to generate an output voltage applied to a load based on the charged electric charge;
a detecting resistor connected between the other end of the second switch and the other end of the third switch, and configured to detect an inductor current flowing through the inductor; and
a control circuit configured to perform control for driving from the first switch to the fourth switch based on the inductor current detected by the detecting resistor.

2. The step up/down converter according to claim 1,
wherein the control circuit is configured to detect a first detection signal based on the output voltage;
and wherein the control circuit comprises:
a first adjusting unit for adjusting the first detection signal based on the output voltage to correspond to a signal level of a predetermined first reference signal;
a second adjusting unit for adjusting a second detection signal containing a signal component based on the output voltage and a signal component based on the detected inductor current to correspond to a signal level of a predetermined second reference signal; and
a driving-signal generating unit for generating a driving signal for driving from the first switch to the fourth switch based on the first adjusting unit and the second adjusting unit.

3. The step up/down converter according to claim 2,
wherein the first adjusting unit includes a first error amplifier for amplifying an error between the first detection signal based on the output voltage and the predetermined first reference signal to generate a first error signal,
wherein the second adjusting unit includes:
an inductor current detecting circuit for generating a current signal generated by averaging a voltage based on the inductor current detected by the detecting resistor;
a second error amplifier for amplifying an error between the second detection signal and the predetermined second reference signal, to generate a second error signal, the second detection signal being a sum of a voltage based on the current signal and the first error signal; and
an offset circuit for subtracting an offset signal from the second error signal to generate a third error signal, and
wherein the driving-signal generating unit comprises:
a first comparator for comparing the second error signal with a predetermined triangular wave signal to generate a first driving signal for driving the first switch and the second switch according to the result of the comparison; and
a second comparator for comparing the third error signal with the triangular wave signal to generate a second driving signal for driving the third switch and the fourth switch according to the result of the comparison.

4. The step up/down converter according to claim 1, wherein the control circuit is configured so as not to detect the inductor current from the detecting resistor when the third switch is placed in an electrical continuity state.

5. The step up/down converter according to claim 1, wherein the load contains a light emitting element.

6. The step up/down converter according to claim 3, wherein the load includes a light emitting element and a constant current source circuit connected in series with the light emitting element, and wherein the first adjusting unit is configured to detect a voltage of the constant current source circuit as the first detected voltage.

7. The step up/down converter according to claim 6, wherein the first reference signal is a voltage corresponding to a minimum voltage required for an operation of the constant current source circuit.

* * * * *